(12) United States Patent
Wang et al.

(10) Patent No.: US 10,862,081 B2
(45) Date of Patent: Dec. 8, 2020

(54) ASSEMBLY STRUCTURE OF COVER AND TERMINAL FOR POWER BATTERY

(71) Applicants: JIANGSU TAFEL NEW ENERGY TECHNOLOGY CO., LTD, Jiangsu (CN); DONGGUAN TAFEL NEW ENERGY TECHNOLOGY CO. LTD, Guangdong (CN); SHENZHEN TAFEL NEW ENERGY TECHNOLOGY CO. LTD, Guangdong (CN)

(72) Inventors: Cheng Wang, Guangdong (CN); Yongjun Li, Guangdong (CN); Kecheng Jiang, Guangdong (CN); Bingyang Hua, Guangdong (CN)

(73) Assignees: JIANGSU TAFEL NEW ENERGY TECHNOLOGY CO., LTD, Jiangsu (CN); DONGGUAN TAFEL NEW ENERGY TECHNOLOGY CO. LTD, Donogguan (CN); SHENZHEN TAFEL NEW ENERGY TECHNOLOGY CO. LTD, Shenzhen (CN)

( * ) Notice: Subject to any disclaimer, the term of this patent is extended or adjusted under 35 U.S.C. 154(b) by 0 days.

(21) Appl. No.: 16/423,638

(22) Filed: May 28, 2019

(65) Prior Publication Data
US 2019/0296275 A1    Sep. 26, 2019

Related U.S. Application Data

(63) Continuation of application No. PCT/CN2017/093553, filed on Jul. 19, 2017.

(51) Int. Cl.
*H01M 2/06* (2006.01)
*H01M 2/04* (2006.01)
(Continued)

(52) U.S. Cl.
CPC ............. *H01M 2/06* (2013.01); *H01M 2/043* (2013.01); *H01M 2/0456* (2013.01); *H01M 2/30* (2013.01);
(Continued)

(58) Field of Classification Search
CPC ...................................................... H01M 2/06
See application file for complete search history.

(56) References Cited

U.S. PATENT DOCUMENTS

2007/0134551 A1* 6/2007 Cyr ........................ H01M 2/266
429/160
2009/0286108 A1* 11/2009 Kim ..................... H01M 8/1097
429/431

(Continued)

FOREIGN PATENT DOCUMENTS

CN        105576159 A       5/2016
CN        105576160 A       5/2016

(Continued)

OTHER PUBLICATIONS

Definitions (Year: 2020).*

*Primary Examiner* — Brian R Ohara
(74) *Attorney, Agent, or Firm* — Wayne & Ken, LLC; Tony Hom

(57) ABSTRACT

An assembly structure of a cover and a terminal for a power battery, including a cover and a terminal. The terminal includes a base and a post extending downwards from the base. The cover is provided with a mounting hole through which the cover is inserted against the terminal. A high-temperature resistant component is provided between the base and the cover, and a conductive block is riveted to a lower end of the terminal. A sealing member is provided between the conductive block and the cover. Different from the existing terminals, the present terminal is T-shaped. Therefore, current carrying area and capacity of the upper (Continued)

surface of the terminal are increased. Further, the riveting structure is provided at a bottom of the terminal, which can avoid the inaesthetic appearance of the terminal caused by soldering. The reliable assembly structure can avoid the terminal loosening and short circuit of the cell.

8 Claims, 8 Drawing Sheets

(51) Int. Cl.
    *H01M 2/30*     (2006.01)
    *H01R 13/03*     (2006.01)
    *H01R 13/631*     (2006.01)

(52) U.S. Cl.
    CPC ............ *H01M 2/305* (2013.01); *H01R 13/03* (2013.01); *H01R 13/631* (2013.01)

(56) References Cited

U.S. PATENT DOCUMENTS

| | | | |
|---|---|---|---|
| 2011/0045345 A1* | 2/2011 | Tsuchiya | H01M 2/22 429/179 |
| 2012/0148910 A1* | 6/2012 | Kambayashi | H01M 2/0434 429/179 |
| 2013/0029190 A1* | 1/2013 | Kim | H01M 2/345 429/61 |

FOREIGN PATENT DOCUMENTS

| | | |
|---|---|---|
| CN | 205211802 U | 5/2016 |
| CN | 106505163 A | 3/2017 |
| CN | 106532099 A | 3/2017 |
| CN | 206250227 U | 6/2017 |
| CN | 206250269 U | 6/2017 |

* cited by examiner

ASSEMBLY STRUCTURE OF COVER AND TERMINAL FOR POWER BATTERY

CROSS-REFERENCE TO RELATED APPLICATIONS

This application is a continuation of International Patent Application No. PCT/CN2017/093553, filed on Jul. 19, 2017, which claims the benefit of priority from Chinese Application No. 201611083939.4, filed on Nov. 30, 2016. The entire contents of the aforementioned applications, including any intervening amendments thereto, are incorporated herein by reference.

TECHNICAL FIELD

The present invention relates to power batteries, and more particularly to an assembly structure of a battery cover and a terminal for a power battery.

BACKGROUND OF THE INVENTION

In the modern-day society with increased environmental awareness, lithium batteries as power sources are widely used in electronic devices such as mobile phones, laptops, electric tools, electric vehicles, etc., which is particularly beneficial for the extensive development and applications of the lithium batteries. Lithium batteries used in electric tools and electric vehicles are usually referred to as power batteries.

Battery terminals are the components for connecting internal cells to an external load or charger, with one end connected to an external circuit and the other end connected to a cell or cells for charge and discharge of the battery. The main requirement for assembling the terminals of the power battery is to ensure the sealing and reliability of the terminal and the cover.

Generally, the terminal comprises a base and a cylinder connected to the base. The method for assembling the terminal mainly comprises threaded assembly and circlip assembly. The threaded assembly is to process threads onto the terminal and then fix the cover with the terminal with nuts. However, this method requires the terminal processed with threads and the nuts, leading to a complicated process, high cost, low assembly efficiency and heavy product. The circlip assembly is to process annular grooves onto the terminal and then to mount the circlips to the annular grooves of the terminal, so that the cover and other components are pressed together to stop axial movements of the components so as to achieve the assembly of the terminal and the cover. Compared to the threaded assembly, the circlip assembly with a high reliability can also reduce the product weight. However, it has the disadvantages of complicated process and low assembly efficiency, and there is a risk of short circuit in cell and terminal loosening due to the misplacement of the circlips.

In addition, both the threaded assembly and the circlip assembly have the following deficiencies. On the one hand, a riveted structure is provided at the top surface of the terminal to leave soldering marks thereon, causing an inaesthetic terminal surface. On the other hand, the existing terminal has an inverted T-shaped mounting structure, resulting in a smaller current carrying area in the terminal surface and a poor current carrying capacity when connected to an external adapter.

Therefore, an improvement of the assembly structure of the terminal of the existing power battery is required for optimization of the assembly structure to ensure the reliability of the assembly of the cover and the terminal, and for improving the current carrying capacity on the terminal surface, also for the aesthetic beauty of the terminal.

SUMMARY OF THE INVENTION

In order to overcome the shortcomings of prior art, the present invention provides an assembly structure of a cover and a terminal for a power battery.

An assembly structure of a cover and a terminal for a power battery comprises a cover and a terminal; wherein the terminal comprises a base and a post extending downwards from the base; the cover is provided with a mounting hole through which the cover is inserted against the terminal; a high-temperature resistant component is provided between the cover and the base; a conductive block is riveted to a lower end of the terminal, and a sealing member is provided between the cover and the conductive block.

In some embodiments, the conductive block is provided with a riveting groove, and the lower end of the terminal is provided with a boss fitting with the riveting groove.

In some embodiments, the conductive block is provided with a soldering groove, and the conductive block is soldered to the post via the soldering groove, so that a soldering rib is formed. The reliability may be relatively low when a riveting method is used only, so a combination of soldering and riveting is preferred to enhance the reliability of the connection between the conductive block and the terminal. The soldering groove is provided to prevent insufficient soldering caused by overly thick solders. In addition, after soldering the post of the terminal and the conductive block, the soldering rib formed at the lower end of the terminal will increase the current carrying area and capacity.

In some embodiments, the high-temperature resistant component is an insulated or conductive high-temperature resistant block. When the terminal is a negative terminal, the cover and the terminal are in insulated connection, so the high-temperature resistant component is an insulated high-temperature resistant block. When the terminal is a positive terminal, the cover and the terminal are electrically connected, so the high-temperature resistant component is a conductive high-temperature resistant block. The insulated high-temperature resistant block and the conductive high-temperature resistant block are in an annular shape.

In some embodiments, the sealing member is an insulated seal ring comprising an annular base and an annular flange extending around the terminal from the annular base to the mounting hole of the cover. The insulated seal ring is stepped, which can effectively prevent a short circuit caused by metal chips and burrs that are created during the processing of the cover or the terminal.

In some embodiments, the cover is provided with a bulge protruding from an upper surface of the cover and formed with a receiving portion at a lower surface of the cover. The mounting hole is provided in the bulge. During the mounting, the conductive block is moved into the receiving portion of the cover, which allows for a basic performance of the power battery and reduces the height of the terminal in the casing to provide more space for cells, so that the energy density of the power battery is increased.

In some embodiments, the base, the high-temperature resistant component and the cover are in sealed connection; and the conductive block, the sealing member and the cover are in sealed connection.

In some embodiments, an upper insulating plastic is provided between the base of the terminal, the high-temperature resistant component and the cover, and a lower insulating plastic is provided between the conductive block, the sealing member and the cover. The provision of the upper and lower insulating plastic enables fixation of the components and enhances the sealing therebetween.

In some embodiments, a soft connector is provided at a lower end of the conductive block. The soft connector is a soft copper connector or a soft aluminum connector. When the terminal is a negative terminal, the conductive block is a copper conductive block, and correspondingly the soft connector is a soft copper connector. When the terminal is a positive terminal, the conductive block is an aluminum conductive block, and correspondingly the soft connector is a soft aluminum connector.

In some embodiments, the terminal is T-shaped.

In some embodiments, the terminal and the conductive block are riveted to form an inverted H-shaped structure. In this way, the high-temperature resistant component, the sealing member and the cover are assembled in the H-shaped structure to prevent axial movements thereof.

In some embodiments, the post of the terminal is a composite copper-aluminum post.

In some embodiments, a first positioning pin is provided between the base of the terminal and the cover, and a second positioning pin is provided between the conductive block and the cover. Preferably, the first positioning pin and the second positioning pin are made of ceramic materials, and are configured to prevent a displacement of components during assembly.

In some embodiments, at least two first positioning pins and at least two second positioning pins are provided.

The benefits of the present invention are as follows. The terminal of the present invention is T-shaped, which is different from the shape of the existing terminal, so that the area of the upper surface of the terminal is increased, thereby improving the current carrying capacity on the terminal surface. The riveting structure is provided at the bottom of the terminal, eliminating the inaesthetic terminal appearance due to soldering. In addition, when the terminal is connected to the conductive block to form an H-shaped structure, the components therebetween are positioned in an axial direction. This enables a compact, safe and reliable structure. The use of nuts and circlips are reduced by giving up the threaded and circlip assemblies, resulting in lower cost and an efficient production. In addition, it also prevents risks of terminal loosening and short circuit of the cell caused by the displacement of the circlips.

Figure 1:
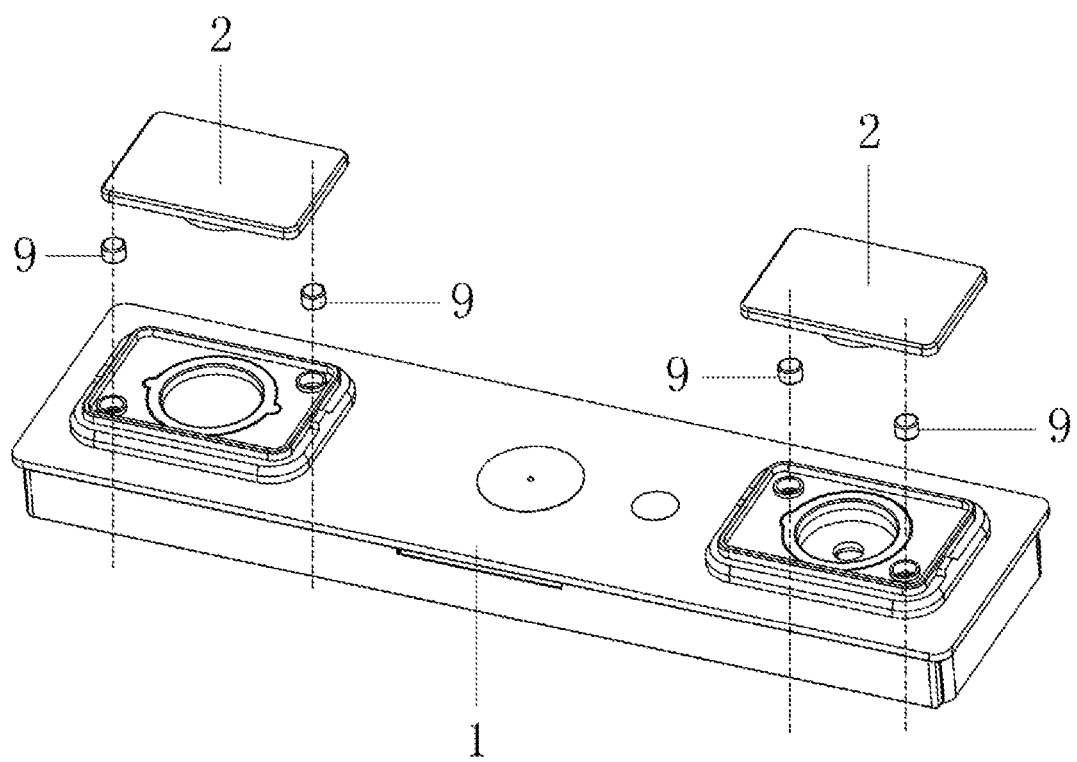
FIG. 1 is a perspective view from the top of an assembly structure of a cover and a terminal for a power battery according to the present invention.
Figure 2:
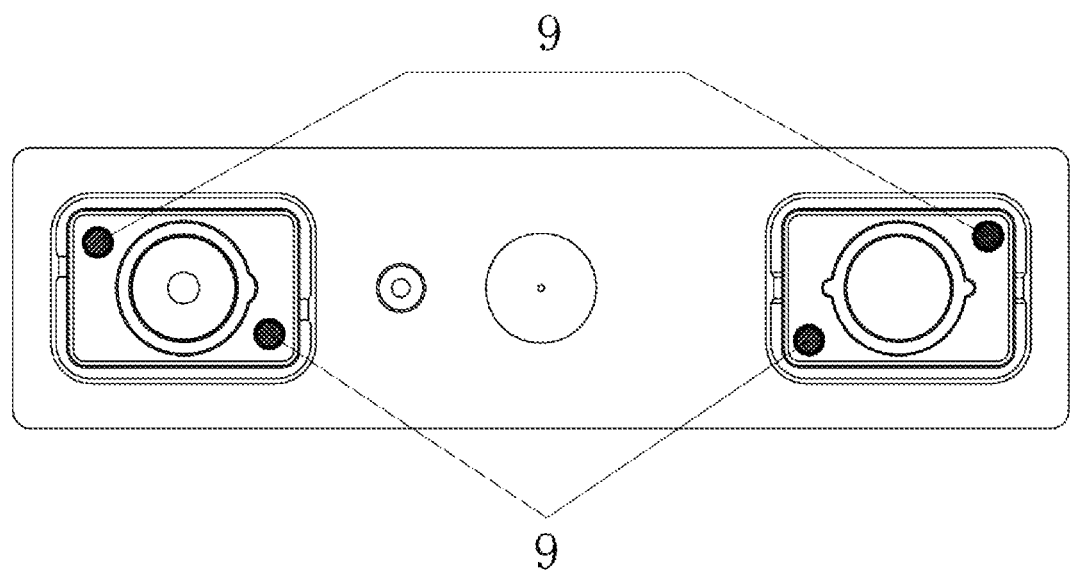
FIG. 2 is a a schematic top view of the cover of the power battery according to the present invention.
Figure 3:
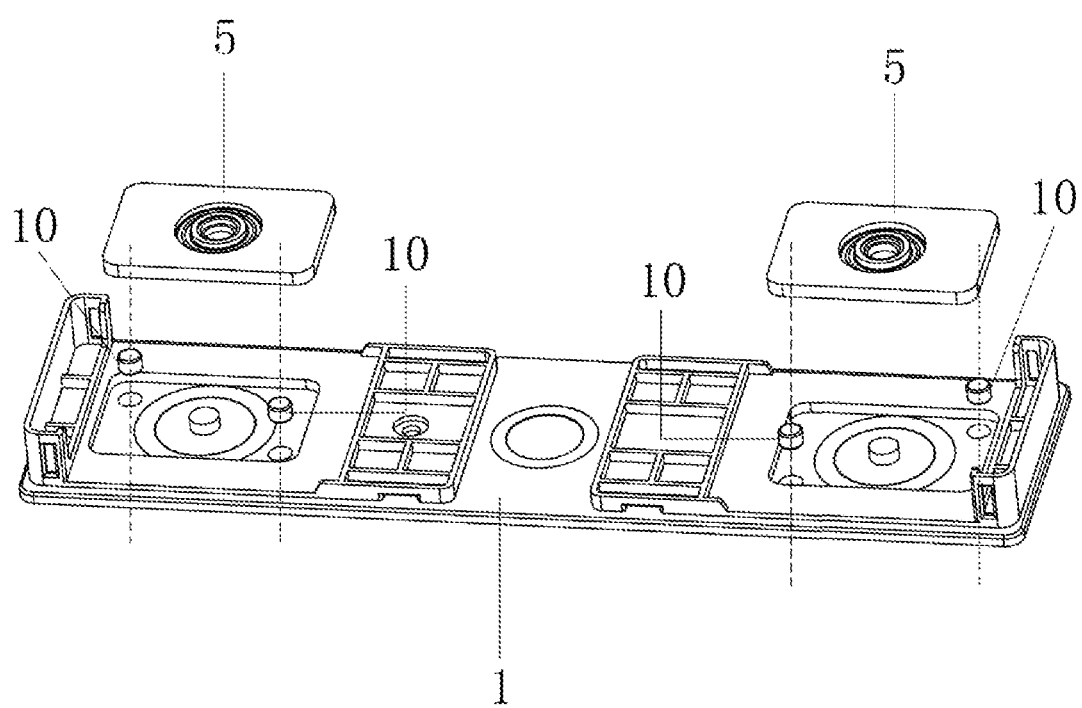
FIG. 3 is a perspective view from the bottom of the assembly structure of a cover and a terminal for a power battery according to the present invention.
Figure 4:
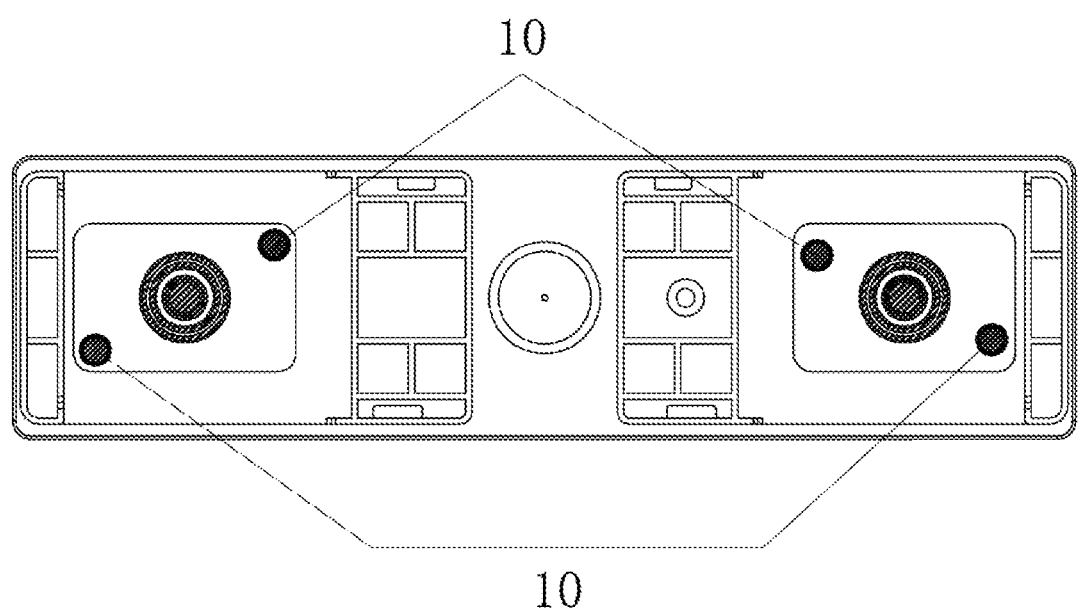
FIG. 4 is schematic bottom view of the cover of the power battery according to the present invention.

REFERENCE NUMERALS 1, cover; 11, bulge; 12, receiving portion; 13, mounting hole; 2, terminal; 21, base; 22, post; 221, -boss; 3, high-temperature resistant component; 4—sealing member; 5—conductive block; 51, riveting groove; 52, soldering groove; 53, soldering rib; 6, soft connector; 7, upper insulating plastic; 8, lower insulating plastic; 9, first positioning pin; 10, second positioning pin.

DETAILED DESCRIPTION OF EMBODIMENTS

The present invention will be further described in detail with reference to embodiments and the accompanying drawings, which are not intended to limit the present invention.

Example 1

Figure 6:
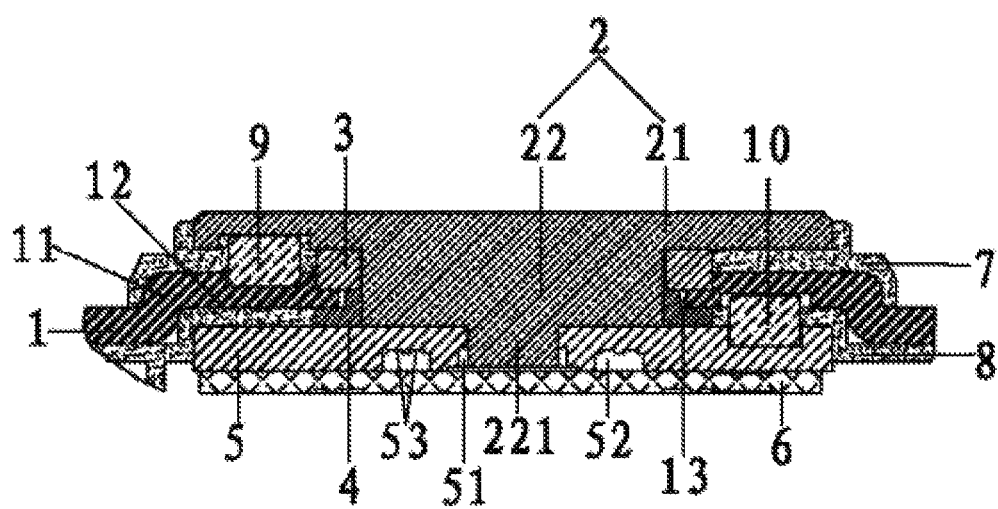
FIG. 6 is a close-up view of portion A in FIG. 5 according to a first embodiment of the present invention.
Figure 8:
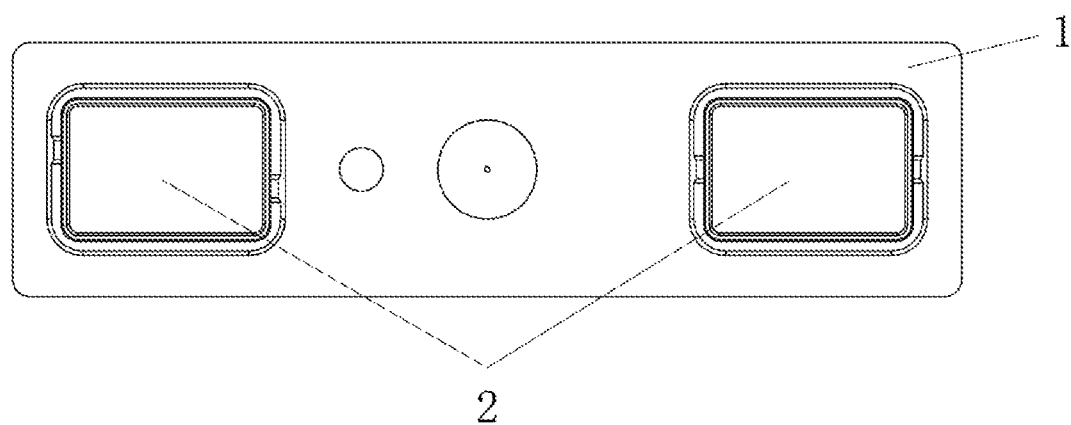
FIG. 8 is a plan view of the assembly structure of a cover and a terminal for a power battery according to the present invention.

As shown in FIGS. 1, 6 and 8, provided is an assembly structure of a cover and a terminal for a power battery, including a cover 1 and a terminal 2. As shown in FIG. 6, the terminal 2 which is T-shaped includes a base 21 and a post 22 extending downwards from the base 21. As shown in FIG. 1, the cover 1 is provided with a bulge 11 protruding from an upper surface of the cover 1 and formed with a receiving portion 12 at a lower surface of the cover 1, and a mounting hole 13 is provided in the bulge 11. The cover 1 is inserted against the terminal 2 through the mounting hole 13.

Figure 5:
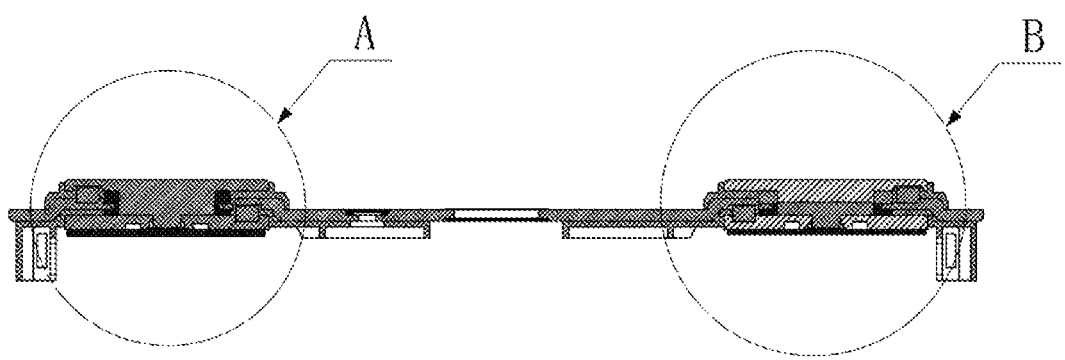
FIG. 5 is front sectional view of the assembly structure of a cover and a terminal for a power battery according to the present invention.
Figure 7:
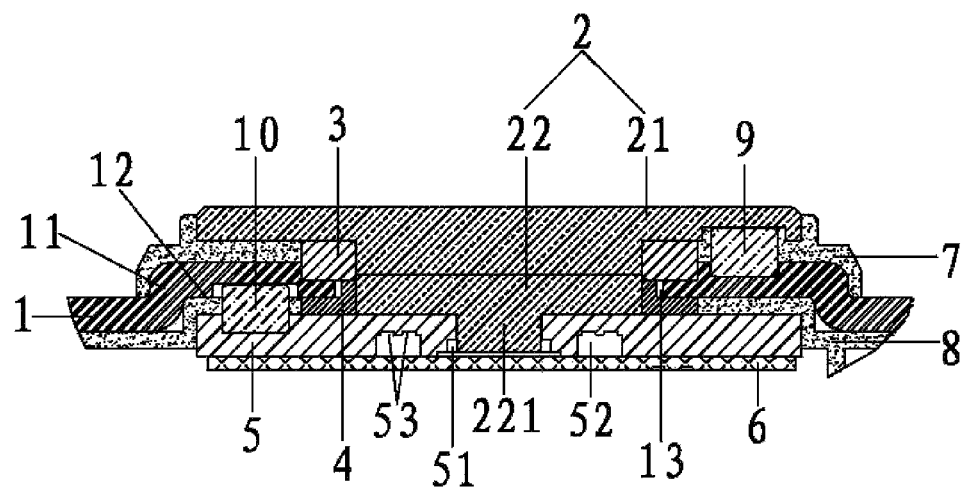
FIG. 7 is a close-up view of portion B in FIG. 5 according to a second embodiment of the present invention.

FIG. 5 shows a cross sectional view of the assembly structure of the present invention, in which portion A is specifically illustrated in FIG. 6 and portion B is specifically illustrated in FIG. 7.

As shown in FIG. 6, a high-temperature resistant component 3 is provided between the base 21 and the cover 1, and the high-temperature resistant component 3 is a high-temperature resistant conductive block having a hollow ring structure. A conductive block 5 is provided with a riveting groove 51 and a soldering groove 52. A lower end of the post 22 is provided with the riveting groove 51 fitting with a boss 221. The conductive block 5 is riveted with the terminal 2 through a cooperation of the boss 221 and the riveting groove 51. The conductive block 5 is soldered to the post 22 via the soldering groove 52, so that a soldering rib 53 is formed. The conductive block 5 can play roles of positioning and electrical conduction. The soldering rib 53 formed by soldering the post 22 of the terminal 2 to the conductive block 5 increases the current carrying area and capacity.

A sealing member 4 is provided between the conductive block 5 and the cover 1. The sealing member 4 is an insulated seal ring, including an annular base and an annular flange extending around the terminal 2 from the annular base to the mounting hole 13 of the cover 1. The insulated seal ring is stepped, which can effectively prevent a short circuit caused by metal chips and burrs that are created during the processing of the cover 1 or the terminal 2. A soft connector 6 is provided at a lower end of the conductive block 5, where the soft connector 6 is a soft aluminum connector, and the conductive block 5 is an aluminum connector.

An upper insulating plastic 7 is provided between the base 21 of the terminal 2, the high-temperature resistant component 3 and the cover 1, and a lower insulating plastic 8 is provided between the conductive block 5, the sealing member 4 and the cover 1. The upper insulating plastic 7 and the lower insulating plastic 8 can effectively fix above-mentioned components, and strengthen a sealing effect therebetween. In order to prevent a displacement in an assembly process, as shown in FIGS. 1-4 and 6, two first positioning pins 9 are provided between the base 21 of the terminal 2 and the cover 1, and two second positioning columns 10 are provided between the conductive block 5 and the cover 1.

Example 2

The present example is similar to Example 1, as shown in FIGS. 1, 7 and 8, the post 22 is a composite of copper-aluminum post which is different from Example 1. The post 22 includes a copper post and an aluminum post which are tightly connected in a soldering manner. The high-temperature resistant component 3 is an insulated high-temperature resistant block having a hollow ring structure. The soft connector 6 is a soft copper connector, and the conductive block 5 is a copper block.

Modifications and changes may be made to the above embodiments by those skilled in the prior art according to the disclosure and teachings of the description. Therefore, the present invention is not limited to the embodiments. Any obvious improvements, substitution or variations of the present invention should fall within the scope of the present invention. In addition, the specific terms used herein are only for illustration and are not intended to limit the invention.

We claim:

1. An assembly structure for a power battery, comprising a cover and a terminal;
   wherein the terminal comprises a base and a post extending downwards from the base; the cover is provided with a mounting hole through which the cover is inserted against the terminal; the cover is provided with a bulge protruding from an upper surface of the cover and formed with a receiving portion at a lower surface of the cover; and the mounting hole is provided in the bulge;
   a high-temperature resistant component is provided between the cover and the base; a conductive block is riveted to a lower end of the terminal, and a sealing member is provided between the conductive block and the cover; the conductive block is provided with a riveting groove, and the lower end of the terminal is provided with a boss fitting with the riveting groove; and
   the conductive block is provided with a soldering groove, and the conductive block is soldered to the post via the soldering groove, so that a soldering rib is formed; a soft connector is provided at a lower end of the conductive block; and the terminal is T-shaped; and
   the base of the terminal, the high-temperature resistant component and the cover are connected in a sealed connection, and an upper insulating plastic is provided between the base of the terminal, the high-temperature resistant component and the cover; and the conductive block, the sealing member and the cover are in a sealed connection, and a lower insulating plastic is provided between the conductive block, the sealing member and the cover.

2. The assembly structure of claim 1, wherein the high-temperature resistant component is an insulated high-temperature resistant block or a conductive high-temperature resistant block.

3. The assembly structure of claim 1, wherein the sealing member is an insulted seal ring, and the insulated seal ring comprises an annular base and an annular flange extending around the terminal from the annular base to the mounting hole of the cover.

4. The assembly structure of claim 1, wherein the soft connector is a soft copper connector or a soft aluminum connector.

5. The assembly structure of claim 1, wherein the terminal and the conductive block are riveted to form an inverted H-shaped structure.

6. The assembly structure claim 1, wherein the post of the terminal is a composite copper-aluminum post.

7. The assembly structure of claim 1, wherein a first positioning pin is provided between the base of the terminal and the cover, and a second positioning pin is provided between the conductive block and the cover.

8. The assembly structure of claim 7, wherein at least two first positioning pins and at least two second positioning pins are provided.

* * * * *